United States Patent
Zhao et al.

(10) Patent No.: US 11,778,520 B2
(45) Date of Patent: Oct. 3, 2023

(54) HANDOVERS OF CONNECTIONS BETWEEN SUBSCRIPTIONS

(71) Applicant: QUALCOMM Incorporated, San Diego, CA (US)

(72) Inventors: Can Zhao, San Diego, CA (US); Suli Zhao, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/652,612

(22) Filed: Feb. 25, 2022

(65) Prior Publication Data

US 2023/0276310 A1   Aug. 31, 2023

(51) Int. Cl.
*H04W 36/00* (2009.01)
*H04W 76/38* (2018.01)
*H04W 36/36* (2009.01)

(52) U.S. Cl.
CPC ..... *H04W 36/0022* (2013.01); *H04W 36/365* (2013.01); *H04W 76/38* (2018.02)

(58) Field of Classification Search
None
See application file for complete search history.

(56) References Cited

U.S. PATENT DOCUMENTS

| | | | |
|---|---|---|---|
| 11,445,414 B2* | 9/2022 | Ukil | H04W 36/0061 |
| 2017/0280380 A1 | 9/2017 | Gundu et al. | |
| 2019/0306898 A1 | 10/2019 | Goddeti et al. | |
| 2020/0178196 A1 | 6/2020 | Wang et al. | |
| 2022/0286994 A1* | 9/2022 | Singh | H04W 76/16 |
| 2022/0337360 A1* | 10/2022 | Lee | H04L 5/0057 |
| 2022/0353774 A1* | 11/2022 | Agarwal | H04W 36/14 |
| 2023/0010588 A1* | 1/2023 | Vadapalli | H04W 76/28 |
| 2023/0050907 A1* | 2/2023 | Sheik | H04W 76/30 |
| 2023/0071751 A1* | 3/2023 | Zhao | H04W 60/005 |

FOREIGN PATENT DOCUMENTS

WO   2021258287 A1   12/2021

OTHER PUBLICATIONS

International Search Report and Written Opinion—PCT/US2023/062135—ISA/EPO—dated Jun. 16, 2023.

* cited by examiner

*Primary Examiner* — Kenny S Lin
(74) *Attorney, Agent, or Firm* — Harrity & Harrity, LLP

(57) ABSTRACT

Various aspects of the present disclosure generally relate to wireless communication. In some aspects, a user equipment (UE) may start, at a default data subscription (DDS) of the UE, a timer associated with a non-Third Generation Partnership Project (non-3GPP) tunnel over a cellular network based at least in part on a DDS switching at the UE. The UE may determine, at the DDS, that the non-3GPP tunnel over the cellular network is available prior to an expiry of the timer. The UE may perform a handover of a non-3GPP tunnel over data connection to the DDS based at least in part on the DDS switching at the UE and the non-3GPP tunnel over the cellular network being available prior to the expiry of the timer. Numerous other aspects are described.

30 Claims, 10 Drawing Sheets

HANDOVERS OF CONNECTIONS BETWEEN SUBSCRIPTIONS

FIELD OF THE DISCLOSURE

Aspects of the present disclosure generally relate to wireless communication and to techniques and apparatuses for handovers of connections between subscriptions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: start, at a default data subscription (DDS) of the UE, a timer associated with a non-Third Generation Partnership Project (non-3GPP) tunnel over a cellular network based at least in part on a DDS switching at the UE; determine, at the DDS, that the non-3GPP tunnel over the cellular network is available prior to an expiry of the timer; and perform a handover of a non-3GPP tunnel over data connection to the DDS based at least in part on the DDS switching at the UE and the non-3GPP tunnel over the cellular network being available prior to the expiry of the timer.

In some implementations, an apparatus for wireless communication at a UE includes a memory and one or more processors, coupled to the memory, configured to: start, at a DDS of the UE, a timer associated with a non-3GPP tunnel over a cellular network based at least in part on a DDS switching at the UE; determine, at the DDS, that the non-3GPP tunnel over the cellular network is not available prior to an expiry of the timer; and perform a UE fallback procedure for a non-3GPP tunnel over data connection of the UE based at least in part on the DDS switching at the UE and the non-3GPP tunnel over the cellular network not being available prior to the expiry of the timer.

In some implementations, a method of wireless communication performed by a UE includes starting, at a DDS of the UE, a timer associated with a non-3GPP tunnel over a cellular network based at least in part on a DDS switching at the UE; determining, at the DDS, that the non-3GPP tunnel over the cellular network is available prior to an expiry of the timer; and performing a handover of a non-3GPP tunnel over data connection to the DDS based at least in part on the DDS switching at the UE and the non-3GPP tunnel over the cellular network being available prior to the expiry of the timer.

In some implementations, a method of wireless communication performed by a UE includes starting, at a DDS of the UE, a timer associated with a non-3GPP tunnel over a cellular network based at least in part on a DDS switching at the UE; determining, at the DDS, that the non-3GPP tunnel over the cellular network is not available prior to an expiry of the timer; and performing a UE fallback procedure for a non-3GPP tunnel over data connection of the UE based at least in part on the DDS switching at the UE and the non-3GPP tunnel over the cellular network not being available prior to the expiry of the timer.

In some implementations, a non-transitory computer-readable medium storing a set of instructions for wireless communication includes one or more instructions that, when executed by one or more processors of a UE, cause the UE to: start, at a DDS of the UE, a timer associated with a non-3GPP tunnel over a cellular network based at least in part on a DDS switching at the UE; determine, at the DDS, that the non-3GPP tunnel over the cellular network is available prior to an expiry of the timer; and perform a handover of a non-3GPP tunnel over data connection to the DDS based at least in part on the DDS switching at the UE and the non-3GPP tunnel over the cellular network being available prior to the expiry of the timer.

In some implementations, a non-transitory computer-readable medium storing a set of instructions for wireless communication includes one or more instructions that, when executed by one or more processors of a UE, cause the UE to: start, at a DDS of the UE, a timer associated with a non-3GPP tunnel over a cellular network based at least in part on a DDS switching at the UE; determine, at the DDS, that the non-3GPP tunnel over the cellular network is not available prior to an expiry of the timer; and perform a UE fallback procedure for a non-3GPP tunnel over data connection of the UE based at least in part on the DDS switching at the UE and the non-3GPP tunnel over the cellular network not being available prior to the expiry of the timer.

In some implementations, an apparatus for wireless communication includes means for starting, at a DDS of the apparatus, a timer associated with a non-3GPP tunnel over a cellular network based at least in part on a DDS switching at the apparatus; means for determining, at the DDS, that the non-3GPP tunnel over the cellular network is available prior to an expiry of the timer; and means for performing a handover of a non-3GPP tunnel over data connection to the DDS based at least in part on the DDS switching at the apparatus and the non-3GPP tunnel over the cellular network being available prior to the expiry of the timer.

In some implementations, an apparatus for wireless communication includes means for starting, at a DDS of the apparatus, a timer associated with a non-3GPP tunnel over a cellular network based at least in part on a DDS switching at the apparatus; means for determining, at the DDS, that the non-3GPP tunnel over the cellular network is not available prior to an expiry of the timer; and means for performing an apparatus fallback procedure for a non-3GPP tunnel over data connection based at least in part on the DDS switching at the apparatus and the non-3GPP tunnel over the cellular network not being available prior to the expiry of the timer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
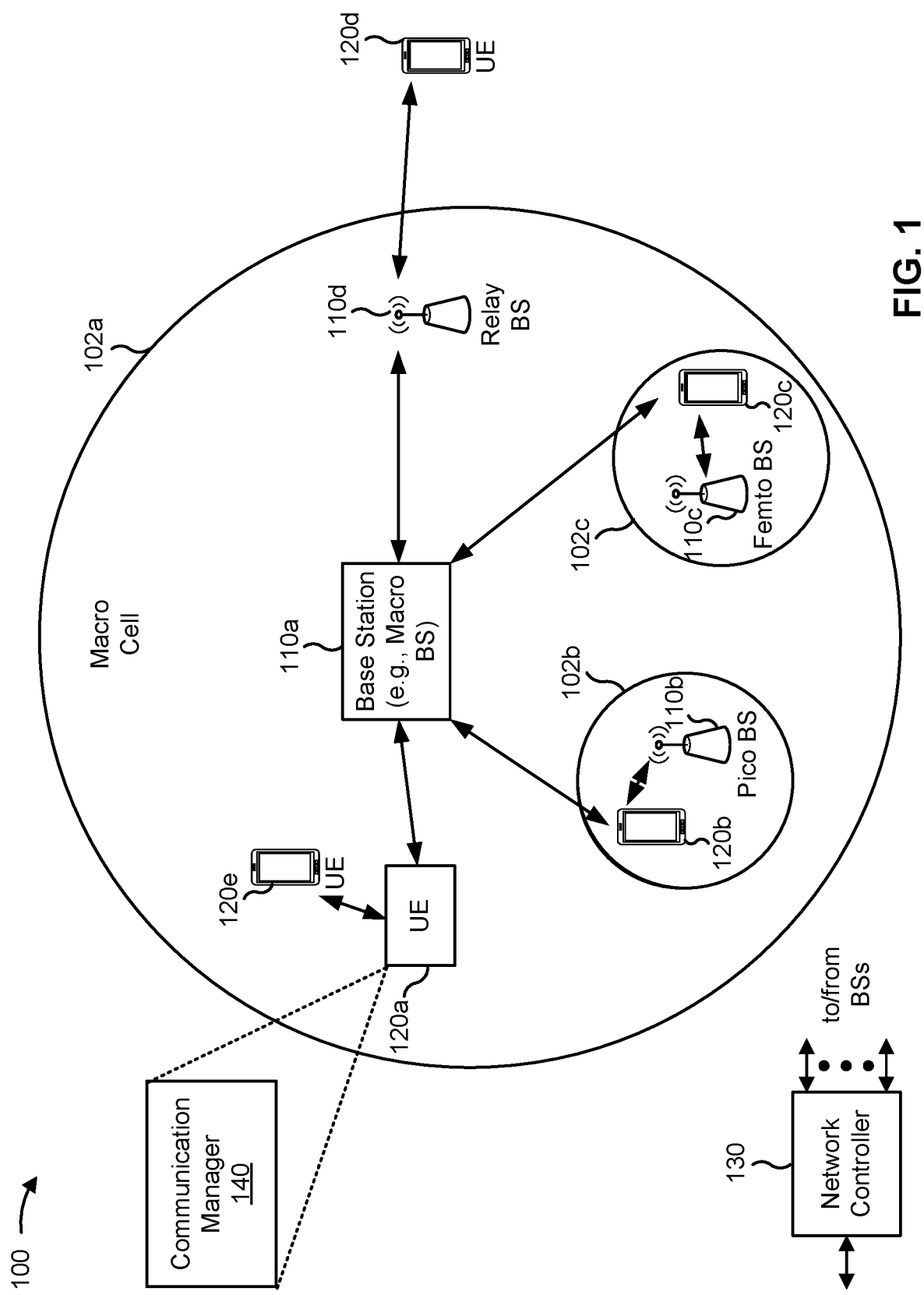
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may start, at a default data subscription (DDS) of the UE, a timer associated with a non-Third Generation Partnership Project (non-3GPP) tunnel over a cellular network based at least in part on a DDS switching at the UE; determine, at the DDS, that the non-3GPP tunnel over the cellular network is available prior to an expiry of the timer; and perform a handover of a non-3GPP tunnel over data connection to the DDS based at least in part on the DDS switching at the UE and the non-3GPP tunnel over the cellular network being available prior to the expiry of the timer. Additionally, or alternatively, the communication manager 140 may perform one or more other operations described herein.

In some aspects, a UE (e.g., UE 120) may include a communication manager 140. As described in more detail elsewhere herein, the communication manager 140 may start, at a DDS of the UE, a timer associated with a non-3GPP tunnel over a cellular network based at least in part on a DDS switching at the UE; determine, at the DDS, that the non-3GPP tunnel over the cellular network is not available prior to an expiry of the timer; and perform a UE fallback procedure for a non-3GPP tunnel over data connection of the UE based at least in part on the DDS switching at the UE and the non-3GPP tunnel over the cellular network not being available prior to the expiry of the timer. Additionally, or alternatively, the communication manager 140 may perform one or more other operations described herein.

As indicated above, FIG. 1 is provided as an example. Other examples may differ from what is described with regard to FIG. 1.

Figure 2:
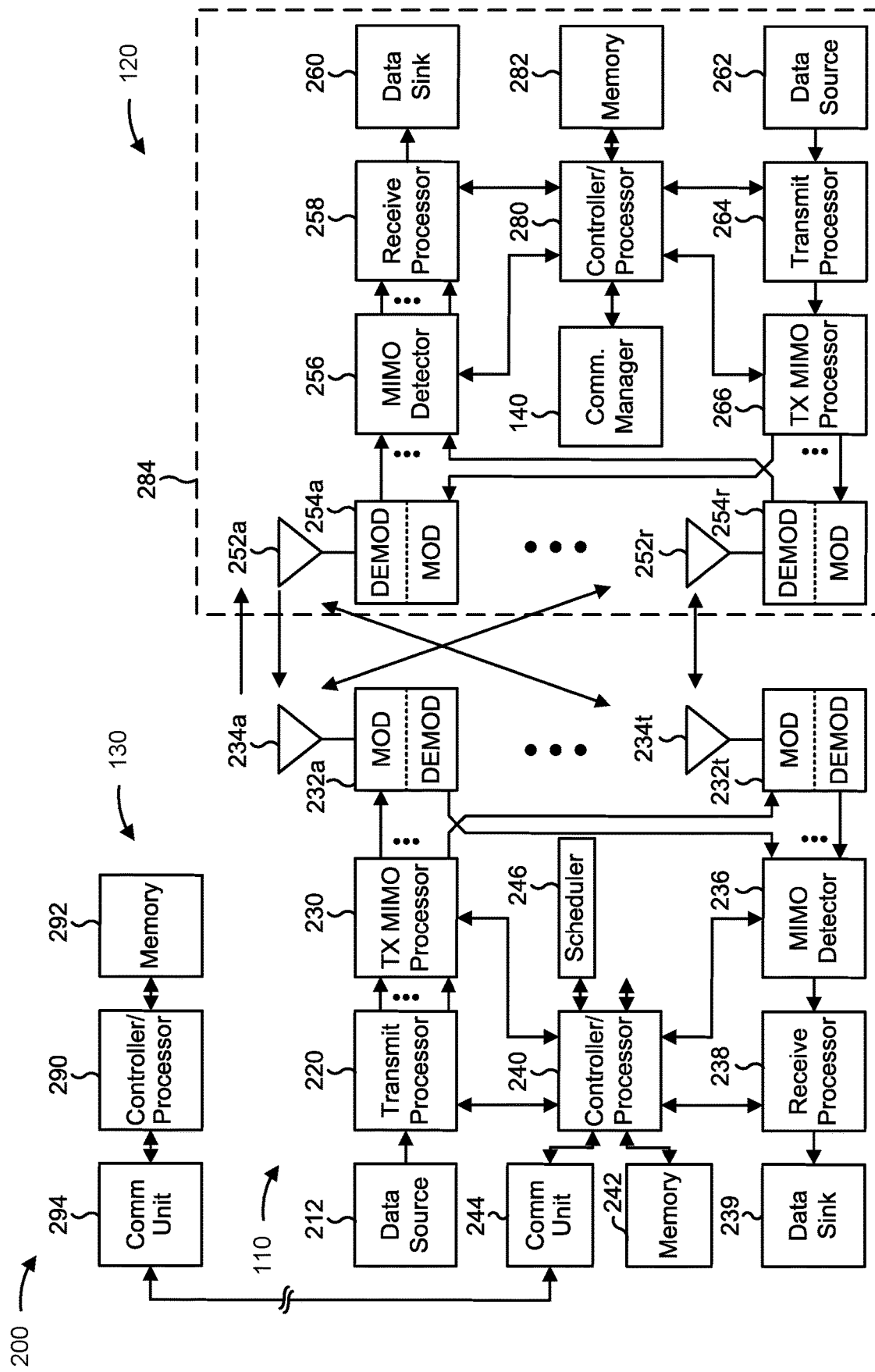
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with handovers of connections between subscriptions, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for starting, at a DDS of the UE, a timer associated with a non-3GPP tunnel over a cellular network based at least in part on a DDS switching at the UE; means for determining, at the DDS, that the non-3GPP tunnel over the cellular network is available prior to an expiry of the timer; and/or means for performing a handover of a non-3GPP tunnel over data connection to the DDS based at least in part on the DDS switching at the UE and the non-3GPP tunnel over the cellular network being available prior to the expiry of the timer. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., UE 120) includes means for starting, at a DDS of the UE, a timer associated with a non-3GPP tunnel over a cellular network based at least in part on a DDS switching at the UE; means for determining, at the DDS, that the non-3GPP tunnel over the cellular network is not available prior to an expiry of the timer; and/or means for performing a UE fallback procedure for a non-3GPP tunnel over data connection of the UE based at least in part on the DDS switching at the UE and the non-3GPP tunnel over the cellular network not being available prior to the expiry of the timer. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

For a voice over LTE (VoLTE) call or a voice over NR (VoNR) call, Internet Protocol (IP) Multimedia Subsystem (IMS) traffic may be transmitted through an IMS packet data network (PDN) connection or protocol data unit (PDU) session directly with a network. The IMS traffic may be voice traffic. For a voice over WiFi (VoWiFi) call, IMS traffic may be transmitted through an evolved Packet Data Gateway (ePDG) tunnel or a Non-3GPP Interworking Function (N3IWF) tunnel between a UE and the network over WiFi. A cellular interworking wireless local area network (C_IWLAN) may provide an ePDG access over cellular feature. When WiFi is not available, the ePDG tunnel or N3IWF tunnel may be established over a cellular Internet connection based at least in part on the C_IWLAN. The C_IWLAN may provide an untrusted WLAN/non-3GPP access over cellular feature.

Figure 3:
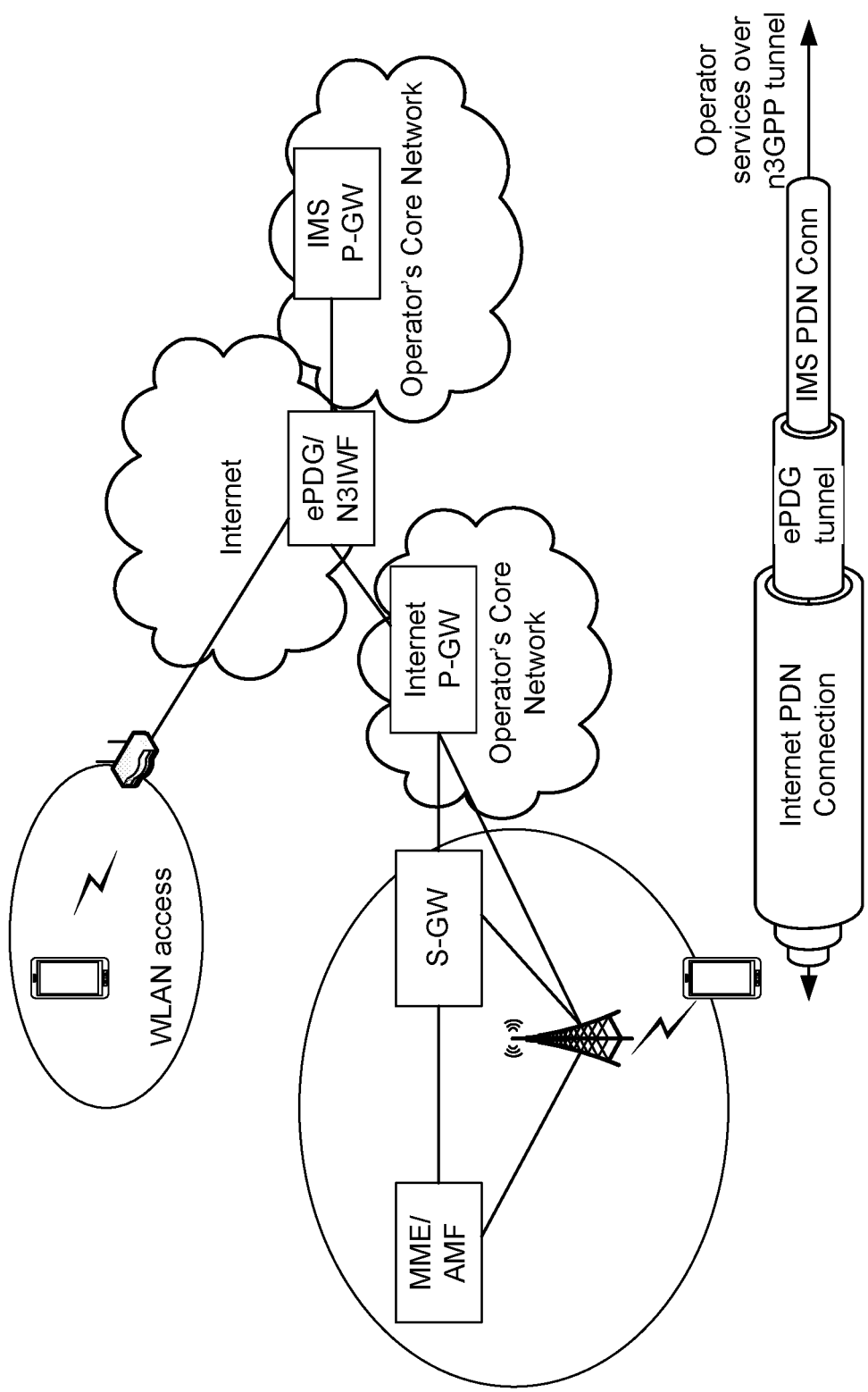
FIG. 3 is a diagram illustrating an example of an evolved Packet Data Gateway (ePDG) access over cellular feature, in accordance with the present disclosure.

FIG. 3 is a diagram illustrating an example 300 of an ePDG access over cellular feature, in accordance with the present disclosure.

As shown in FIG. 3, a UE may transmit IMS traffic via a WLAN access point. The WLAN access point may be associated with WiFi. The WLAN access point may transmit the IMS traffic to an ePDG via an ePDG tunnel, or the WLAN access point may transmit the IMS traffic to an N3IWF via an N3IWF tunnel. In other words, the UE may transmit the IMS traffic to the ePDG/N3IWF via the WLAN access point over WiFi. When WiFi is not available, the UE may transmit the IMS traffic to the ePDG/N3IWF using a C_IWLAN. The C_IWLAN may allow a cellular Internet connection associated with the UE, or an Internet PDN connection, to be used to establish the ePDG/N3IWF tunnel, which may carry an IMS PDN connection or IMS PDU session. The UE may transmit the IMS traffic to the ePDG/N3IWF using the cellular Internet connection based at least in part on the C_IWLAN. The ePDG/N3IWF may transmit the IMS traffic to an IMS PDN gateway (P-GW) or an Internet P-GW associated with an operator core network. The Internet P-GW may transmit the IMS traffic to a serving gateway (S-GW), a base station (e.g., a 3G, 4G, or 5G base station), and/or a mobility management entity (MME) or access and mobility management function (AMF), which may direct the IMS traffic to a target UE.

As indicated above, FIG. 3 is provided as an example. Other examples may differ from what is described with regard to FIG. 3.

A UE that supports a dual subscriber identification module (SIM) dual-active (DSDA) mode, or a multi-SIM (MSIM) device, may include two SIM cards that have the capability to operate in two separate networks. The two SIM cards may be associated with two separate subscriptions. For example, each SIM card may store network-specific information used to authenticate and identify subscribers on a specific network. A first SIM card may be associated with a first subscription, and a second SIM card may be associated with a second subscription. The first subscription may be associated with a first RAT and/or a first network operator, and the second subscription may be associated with a second RAT and/or a second network operator.

The first subscription of the UE may be associated with Internet/data traffic. The first subscription may be a DDS. The second subscription of the UE may be associated with voice and short messaging service (SMS) traffic. The second subscription may be a non-DDS (nDDS).

A C_IWLAN PDN connection (or C_IWLAN PDU session) of the UE may be associated with the DDS. The C_IWLAN PDN connection may also be referred to as a non-3GPP tunnel over data connection. The C_IWLAN PDN connection may be associated with an active voice call (or an existing voice call). An underlying connection associated with the C_IWLAN PDN connection may use the DDS, as opposed to the nDDS. An ePDG/N3IWF tunnel may be established on top of a cellular Internet connection associated with the DDS, as opposed to a cellular Internet connection associated with the nDDS. In some cases, multiple C_IWLAN PDN connections may belong to either the DDS or the nDDS, but the underlying connection may use the DDS.

In some cases, the DDS may sometimes switch due to a user choice or device status (e.g., voice call on nDDS). For example, at a first time, the first subscription of the UE may be the DDS (e.g., old DDS) and the second subscription of the UE may be the nDDS, but at a second time, the first subscription may become the nDDS and the second subscription may become the DDS (e.g., new DDS). When the DDS switching occurs, the UE needs to transfer the C_IWLAN PDN connection (or non-3GPP tunnel over data connection) between subscriptions. The UE may need to transfer the C_IWLAN PDN connection from the old DDS to the new DDS. The UE may change the underlying connection of the multiple C_IWLAN PDN connections from the old DDS to the new DDS, such that the ePDG/N3IWF tunnel may be established on top of a cellular Internet connection associated with the new DDS instead of the old DDS.

One problem is that when the DDS switching occurs from the old DDS to the new DDS, the C_IWLAN PDN connection associated with the old DDS may be transferred from a C_IWLAN associated with the old DDS to a wireless wide area network (WWAN) (e.g., a 5G WWAN), and then the C_IWLAN PDN connection may be transferred to a C_IWLAN associated with the new DDS. When the WWAN is not available, the active voice call associated with the C_IWLAN PDN connection may be dropped. The old DDS may be out-of-service (OOS), so the C_IWLAN PDN connection belonging to the old DDS may be unable to be transferred to the WWAN, which may result in the C_IWLAN PDN connection being released and the active voice call being dropped.

Another problem is that when the WWAN is available, the UE may need to perform two back-to-back handover procedures for the C_IWLAN PDN connection, which may result in a relatively long service interruption and high signaling overhead. The service interruption may be approximately four seconds due to the two back-to-back handover procedures. A first handover procedure may involve an old DDS C_IWLAN to WWAN handover, which may take approximately two seconds. A second handover procedure may involve a WWAN to new DDS C_IWLAN handover, which may take approximately two seconds. A user experience for the active voice call over the C_IWLAN PDN connection may be poor, due to the approximately four second service interruption. Further, when VoNR is not supported, when the UE transfers the active voice call to the WWAN, an Evolved Packet System (EPS) fallback may be triggered, which may add an additional service interruption for the active voice call.

In various aspects of techniques and apparatuses described herein, a UE may start, at a DDS of the UE, a timer associated with a non-3GPP tunnel over a cellular network based at least in part on a DDS switching at the UE. The DDS may be a new DDS based at least in part on the DDS switching. The new DDS may be associated with a second subscription of the UE, whereas an old DDS may be associated with a first subscription of the UE, based at least in part on the DDS switching. The non-3GPP tunnel over a cellular network may be associated with a C_IWLAN. The UE may determine, at the DDS, that the non-3GPP tunnel over the cellular network is available prior to an expiry of the timer. The UE may perform a handover of a non-3GPP tunnel over data connection to the DDS based at least in part on the DDS switching at the UE and the non-3GPP tunnel over the cellular network being available prior to the expiry of the timer. The non-3GPP tunnel over data connection may be a C_IWLAN PDN connection. The non-3GPP tunnel over data connection may be associated with an active voice call. In some cases, the non-3GPP tunnel over data connection may not be associated with an active voice call. The UE may directly hand over the non-3GPP tunnel over data connection to the DDS without initially handing over the non-3GPP tunnel over data connection to a WWAN (e.g., cellular service). The WWAN may or may not be associated with the DDS. As a result, the UE may avoid the problems described herein.

In some aspects, by performing the handover of the non-3GPP tunnel over data connection directly to the DDS based at least in part on the timer, the active voice call associated with the non-3GPP tunnel over data connection may be continued during the DDS switching when the WWAN is unavailable. The UE may avoid performing back-to-back handover procedures and EPS fallback based at least in part on the non-3GPP tunnel over data connection being directly handed over to the DDS using the timer. The UE may reduce a service interruption to the active voice call from approximately four seconds to approximately one second based at least in part on the non-3GPP tunnel over data connection being directly handed over to the DDS using the timer. The UE may reduce a signaling overhead for the non-3GPP tunnel over data connection based at least in part on the non-3GPP tunnel over data connection being directly handed over to the DDS using the timer.

In some aspects, the UE may reduce the service interruption to the active voice call on the non-3GPP tunnel over data connection during the DDS switching, where the non-3GPP tunnel over data connection may be associated with an untrusted WLAN/non-3GPP access over cellular. The UE may enable a continuity (or near continuity) of the non-3GPP tunnel over data connection during the DDS switching when the WWAN is unavailable, where the C_IWLAN PDN connection may be using the untrusted WLAN/non-3GPP access over cellular during the DDS switch. The UE may avoid an unnecessary back-to-back handover of the non-3GPP tunnel over data connection during the DDS switching. The UE may avoid the EPS fallback of the active voice call that is made using the untrusted WLAN/non-3GPP access over cellular during the DDS switching.

Figure 4:
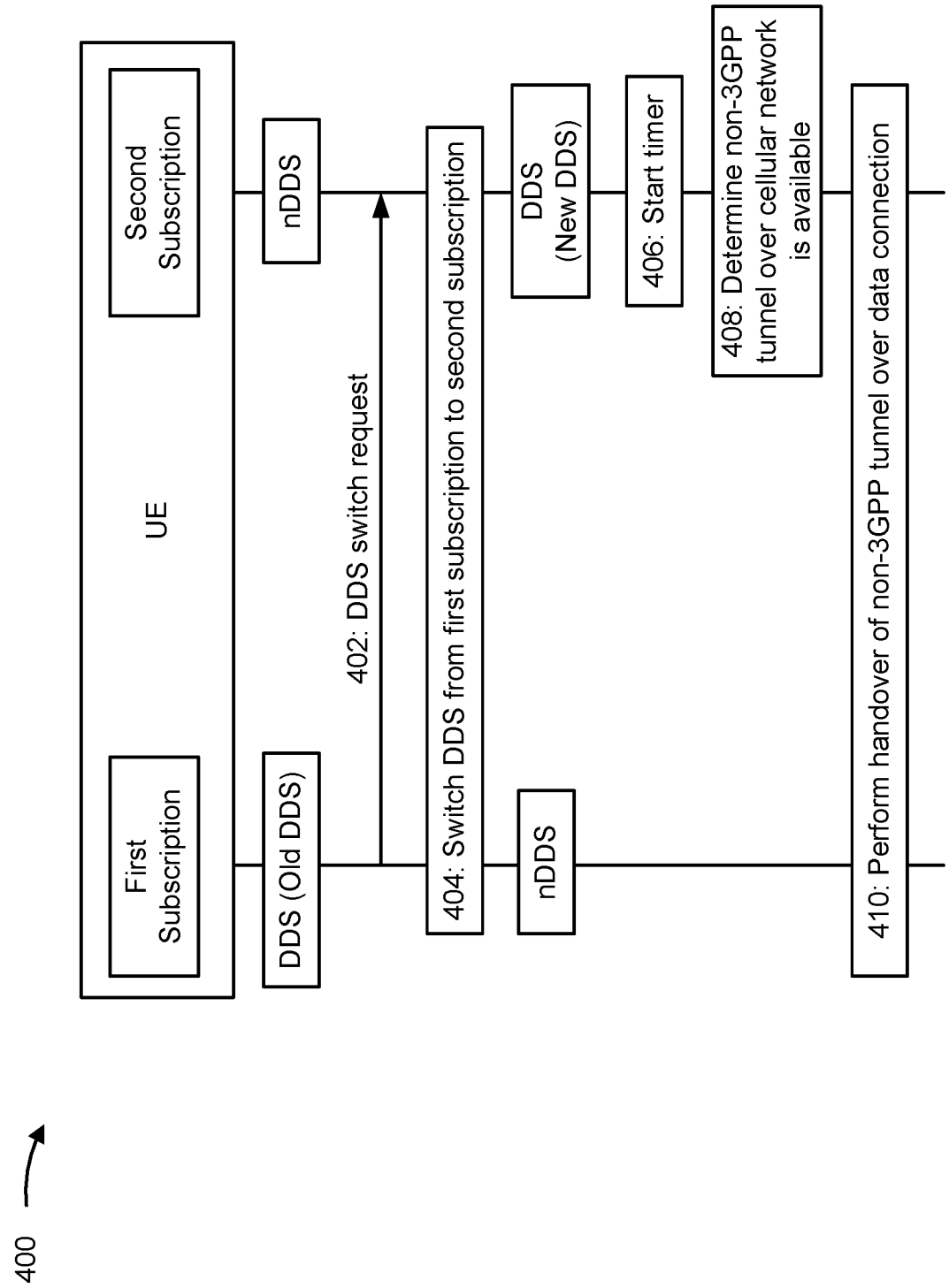
FIGS. 4-7 are diagrams illustrating examples associated with handovers of connections between subscriptions, in accordance with the present disclosure.

FIG. 4 is a diagram illustrating an example 400 associated with handovers of connections between subscriptions of a UE, in accordance with the present disclosure.

In some aspects, a DDS associated with a first subscription (an old DDS) of the UE may be associated with a non-3GPP tunnel over data connection (or C_IWLAN PDN connection). The non-3GPP tunnel over data connection may include an ePDG tunnel or a non-3GPP interworking function tunnel. The non-3GPP tunnel over data connection may be associated with an active voice call, where the active voice call may be performed using the DDS associated with the first subscription. The non-3GPP tunnel over data connection may be associated with a non-3GPP tunnel over a cellular network (or C_IWLAN) of the DDS associated with the first subscription. The DDS may be associated with Internet and data traffic.

As shown by reference number 402, the DDS associated with the first subscription of the UE may transmit a DDS switch request to an nDDS associated with a second subscription of the UE. The DDS switch request may be based at least in part on a user input via a user interface of the UE and/or a status of the UE. The DDS switch request may be to switch the DDS from the first subscription to the second subscription. The nDDS may be associated with voice data and short messaging service traffic.

As shown by reference number 404, the UE may switch, based at least in part on the DDS switch request, the DDS associated with the first subscription to a DDS associated with the second subscription. After the DDS switch request is fulfilled, the DDS may be associated with the second subscription and the nDDS may be associated with the first subscription. At this point, the DDS may be associated with the second subscription and may be a new DDS, as opposed to the old DDS that was previously associated with the first subscription. In some aspects, since the DDS may be switched from the first subscription to the second subscription, and the non-3GPP tunnel over data connection associated with the old DDS cannot be continued on the first subscription after the first subscription becomes the nDDS, the UE may need to hand over the non-3GPP tunnel over data connection to the new DDS.

In some aspects, the first subscription of the UE may be a DDS (the old DDS) prior to the DDS switching, and the second subscription of the UE may be an nDDS prior to the DDS switching. The first subscription of the UE may be an nDDS based at least in part on the DDS switching, and the second subscription of the UE may be the DDS (the new DDS) based at least in part on the DDS switching. The DDS switching may involve switching data traffic from the first subscription to the second subscription.

As shown by reference number 406, the UE may start, at the new DDS, a timer (e.g., a T_waitForCIWLAN timer) associated with a non-3GPP tunnel over a cellular network for the new DDS. The UE may start the timer at the new DDS based at least in part on the DDS switch request.

As shown by reference number 408, the UE may determine, at the new DDS, that the non-3GPP tunnel over the cellular network is available at the new DDS prior to an expiry of the timer. In other words, while the timer is still running, the UE may determine that the non-3GPP tunnel over the cellular network has become available at the new DDS. While the timer is running, the UE may determine to not transfer the non-3GPP tunnel over data connection to a WWAN.

As shown by reference number 410, the UE may perform a handover of the non-3GPP tunnel over data connection from the old DDS to the new DDS based at least in part on the non-3GPP tunnel over the cellular network being available at the DDS associated with the second subscription prior to the expiry of the timer. The UE may perform the handover of the non-3GPP tunnel over data connection from the non-3GPP tunnel over the cellular network of the old DDS to the non-3GPP tunnel over the cellular network of the new DDS. The UE may directly hand over the non-3GPP tunnel over data connection to the new DDS without the non-3GPP tunnel over data connection being handed over to the WWAN. In other words, the UE may not hand over the non-3GPP tunnel over data connection to the WWAN before handing over the non-3GPP tunnel over data connection to the new DDS. The UE may perform the handover of the non-3GPP tunnel over data connection based at least in part on signaling between the new DDS and a network entity serving the second subscription.

As indicated above, FIG. 4 is provided as an example. Other examples may differ from what is described with regard to FIG. 4.

Figure 5:
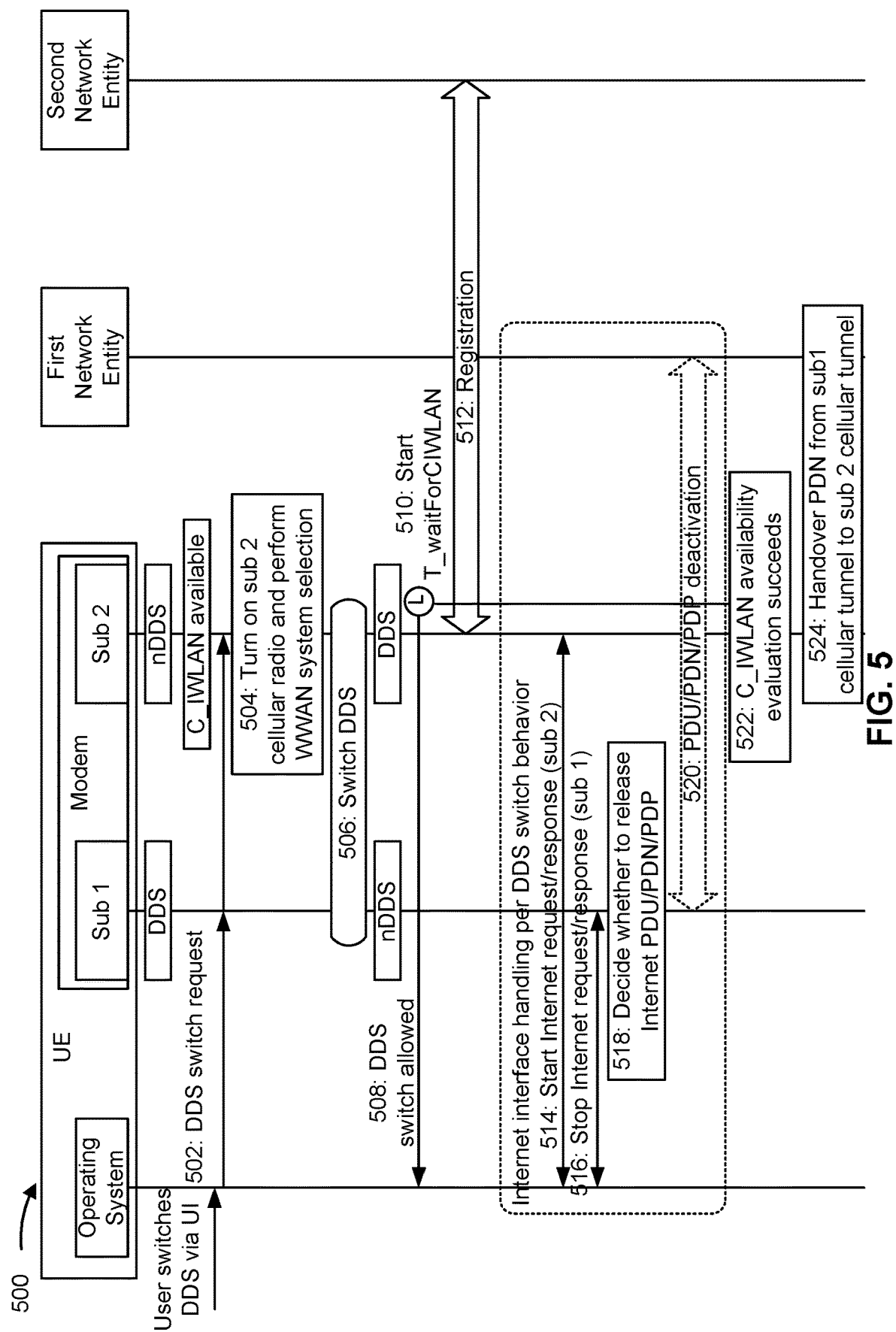

FIG. 5 is a diagram illustrating an example 500 associated with handovers of connections between subscriptions, in accordance with the present disclosure. As shown in FIG. 5, example 500 includes communication between a UE (e.g., UE 120), a first network entity (e.g., base station 110a), and a second network entity (e.g., base station 110b). In some aspects, the UE, the first network entity, and the second network entity may be included in a wireless network, such as wireless network 100.

In some aspects, the UE may include a first subscription and a second subscription. The first subscription may be associated with the first network entity, which may serve the first subscription. The second subscription may be associated with the second network entity, which may serve the second subscription. A DDS may initially be associated with the first subscription, and an nDDS may initially be associated with the second subscription. A C_IWLAN (or non-3GPP tunnel over cellular network) may be available at the second subscription when the nDDS is associated with the second subscription.

As shown by reference number 502, the first subscription may receive a DDS switch request from an operating system of the UE. The DDS switch request may be based at least in part on a user of the UE indicating a DDS switch via a user interface of the UE. The first subscription may forward the DDS switch request to the second subscription.

As shown by reference number 504, the second subscription may turn on a cellular radio associated with the second subscription (when the cellular radio was previously off). The second subscription may perform a WWAN system selection.

As shown by reference number 506, the first subscription and the second subscription may perform a DDS switching based at least in part on the DDS switch request. The DDS switching may result in the nDDS becoming associated with the first subscription and the DDS becoming associated with the second subscription. The first subscription may be an old DDS, and the second subscription may be a new DDS.

As shown by reference number 508, the first subscription may transmit, to the operating system, a message indicating that the DDS switching was allowed. The first subscription may transmit the message after the DDS switching occurs.

As shown by reference number 510, the new DDS may start a T_waitForCIWLAN timer based at least in part on the DDS switching. The T_waitForCIWLAN timer may be associated with a C_IWLAN of the new DDS.

As shown by reference number 512, the new DDS may perform a registration and Internet connection establishment with the second network entity.

In some aspects, the UE may perform an Internet interface handling per a DDS switch behavior. As shown by reference number 514, the operating system and the new DDS may transmit a start Internet request and a start Internet response, respectively. As shown by reference number 516, the operating system and the new DDS may transmit a stop Internet request and a start Internet response, respectively. As shown by reference number 518, the first subscription may determine whether to release an Internet PDU or PDN or packet data protocol (PDP). As shown by reference number 520, the first subscription and the first network entity may perform a PDU/PDN/PDP deactivation.

As shown by reference number 522, the new DDS may determine, before an expiry of the T_waitForCIWLAN timer, that the C_IWLAN of the new DDS is available. In other words, the new DDS may determine that a C_IWLAN availability evaluation succeeds.

As shown by reference number 524, the new DDS may perform a handover of a C_IWLAN PDN connection (or non-3GPP tunnel over data connection) to the new DDS.

The C_IWLAN PDN connection may be associated with an active voice call of the UE, where the active voice call may initially be performed using the old DDS. The new DDS may perform the handover of the C_IWLAN PDN connection from a tunnel established over a cellular Internet connection associated with the first subscription to a tunnel established over a cellular Internet connection associated with the second subscription (e.g., a handover from a first subscription cellular tunnel to a second subscription cellular tunnel).

In some aspects, the UE may perform a transfer of the C_IWLAN PDN connection directly from the old DDS to the new DDS, which may minimize a service interruption associated with the active voice call during the DDS switching. When the DDS switching is triggered, the new DDS may start the T_waitForCIWLAN timer. When the C_IWLAN of the new DDS is available before the T_waitForCIWLAN timer expires, the UE may hand over the C_IWLAN PDN connection directly from the old DDS to the new DDS.

As indicated above, FIG. 5 is provided as an example. Other examples may differ from what is described with regard to FIG. 5.

Figure 6:
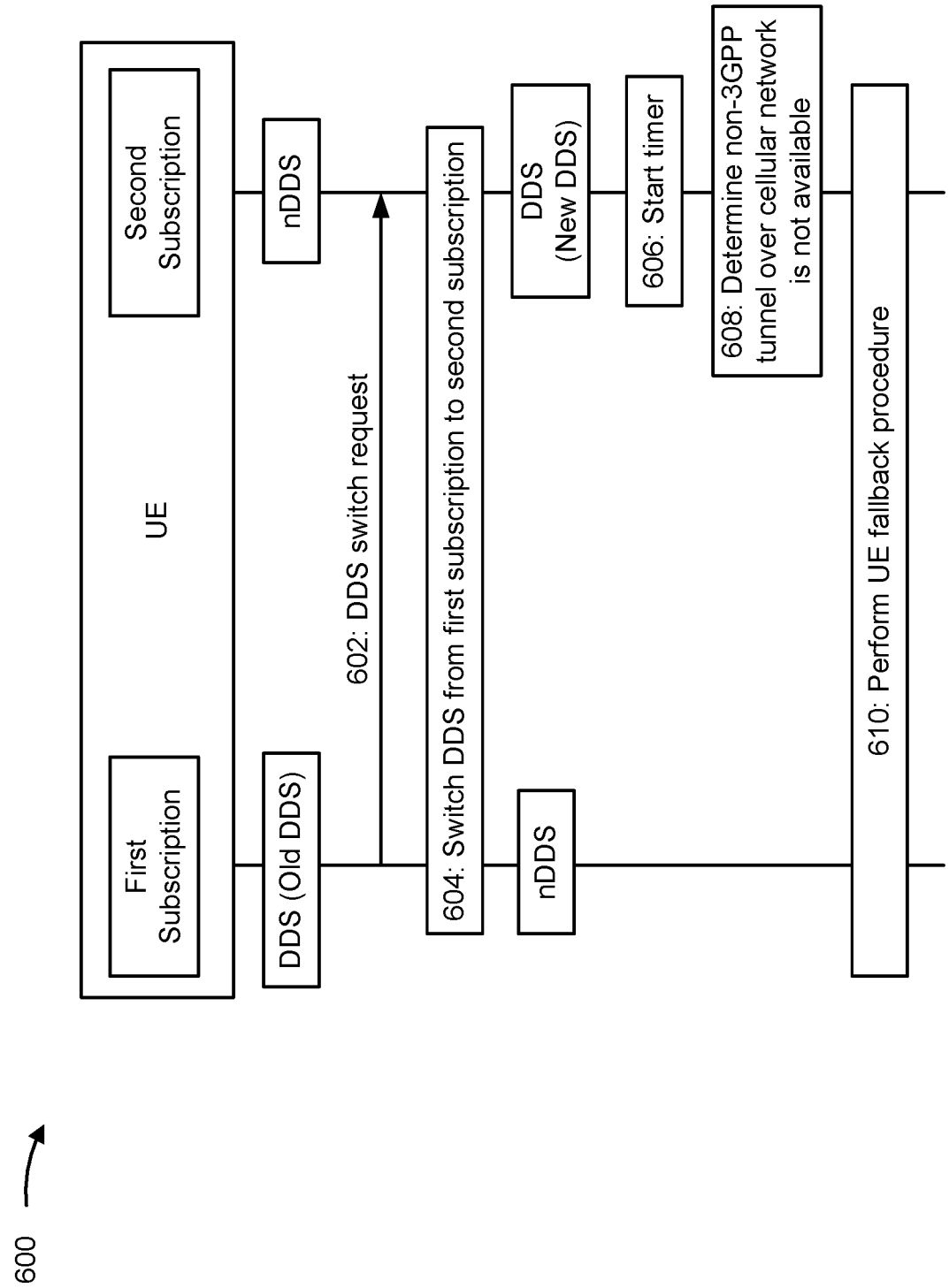

FIG. 6 is a diagram illustrating an example 600 associated with handovers of connections between subscriptions, in accordance with the present disclosure.

In some aspects, a DDS associated with a first subscription (an old DDS) of the UE may be associated with a non-3GPP tunnel over data connection (or C_IWLAN PDN connection). The non-3GPP tunnel over data connection may include an ePDG tunnel or a non-3GPP interworking function tunnel. The non-3GPP tunnel over data connection may be associated with an active voice call, where the active voice call may be performed using the DDS associated with the first subscription. The non-3GPP tunnel over data connection may be associated with a non-3GPP tunnel over a cellular network (or C_IWLAN) of the DDS associated with the first subscription. The DDS may be associated with Internet and data traffic.

As shown by reference number 602, the DDS associated with the first subscription of the UE may transmit a DDS switch request to an nDDS associated with a second subscription of the UE. The DDS switch request may be based at least in part on a user input via a user interface of the UE and/or a status of the UE. The DDS switch request may be to switch the DDS from the first subscription to the second subscription. The nDDS may be associated with voice data and short messaging service traffic.

As shown by reference number 606, the UE may switch, based at least in part on the DDS switch request, the DDS associated with the first subscription to a DDS associated with the second subscription. After the DDS switch request is fulfilled, the DDS may be associated with the second subscription and the nDDS may be associated with the first subscription. At this point, the DDS may be associated with the second subscription and may be a new DDS, as opposed to the old DDS that was previously associated with the first subscription. In some aspects, since the DDS may be switched from the first subscription to the second subscription, and the non-3GPP tunnel over data connection associated with the old DDS cannot be continued on the first subscription after the first subscription becomes the nDDS, the UE may need to hand over the non-3GPP tunnel over data connection to the new DDS.

In some aspects, the first subscription of the UE may be a DDS (the old DDS) prior to the DDS switching and the second subscription of the UE may be an nDDS prior to the DDS switching. The first subscription of the UE may be an nDDS based at least in part on the DDS switching and the second subscription of the UE may be the DDS (the new DDS) based at least in part on the DDS switching. The DDS switching may involve switching data traffic from the first subscription to the second subscription.

As shown by reference number 606, the UE may start, at the new DDS, a timer (e.g., a T_waitForCIWLAN timer) associated with a non-3GPP tunnel over a cellular network for the new DDS. The UE may start the timer at the new DDS based at least in part on the DDS switch request.

As shown by reference number 608, the UE may determine, at the new DDS, that the non-3GPP tunnel over the cellular network is not available at the new DDS prior to an expiry of the timer. In other words, while the timer is still running, the UE may determine that the non-3GPP tunnel over the cellular network has not become available at the new DDS.

As shown by reference number 610, the UE may perform a UE fallback procedure for the non-3GPP tunnel over data connection of the old DDS based at least in part on the non-3GPP tunnel over the cellular network not being available at the new DDS prior to the expiry of the timer. When performing the UE fallback procedure, the UE may perform a handover of the non-3GPP tunnel over data connection from the old DDS to a WWAN of the new DDS. The UE may determine, after the non-3GPP tunnel over data connection is handed over to the WWAN, that the non-3GPP tunnel over the cellular network is available at the new DDS. The UE may perform a handover of the non-3GPP tunnel over data connection from the WWAN to the non-3GPP tunnel over the cellular network of the new DDS. The UE may perform the handover of the non-3GPP tunnel over data connection based at least in part on signaling between the new DDS and a network entity serving the second subscription.

As indicated above, FIG. 6 is provided as an example. Other examples may differ from what is described with regard to FIG. 6.

Figure 7:
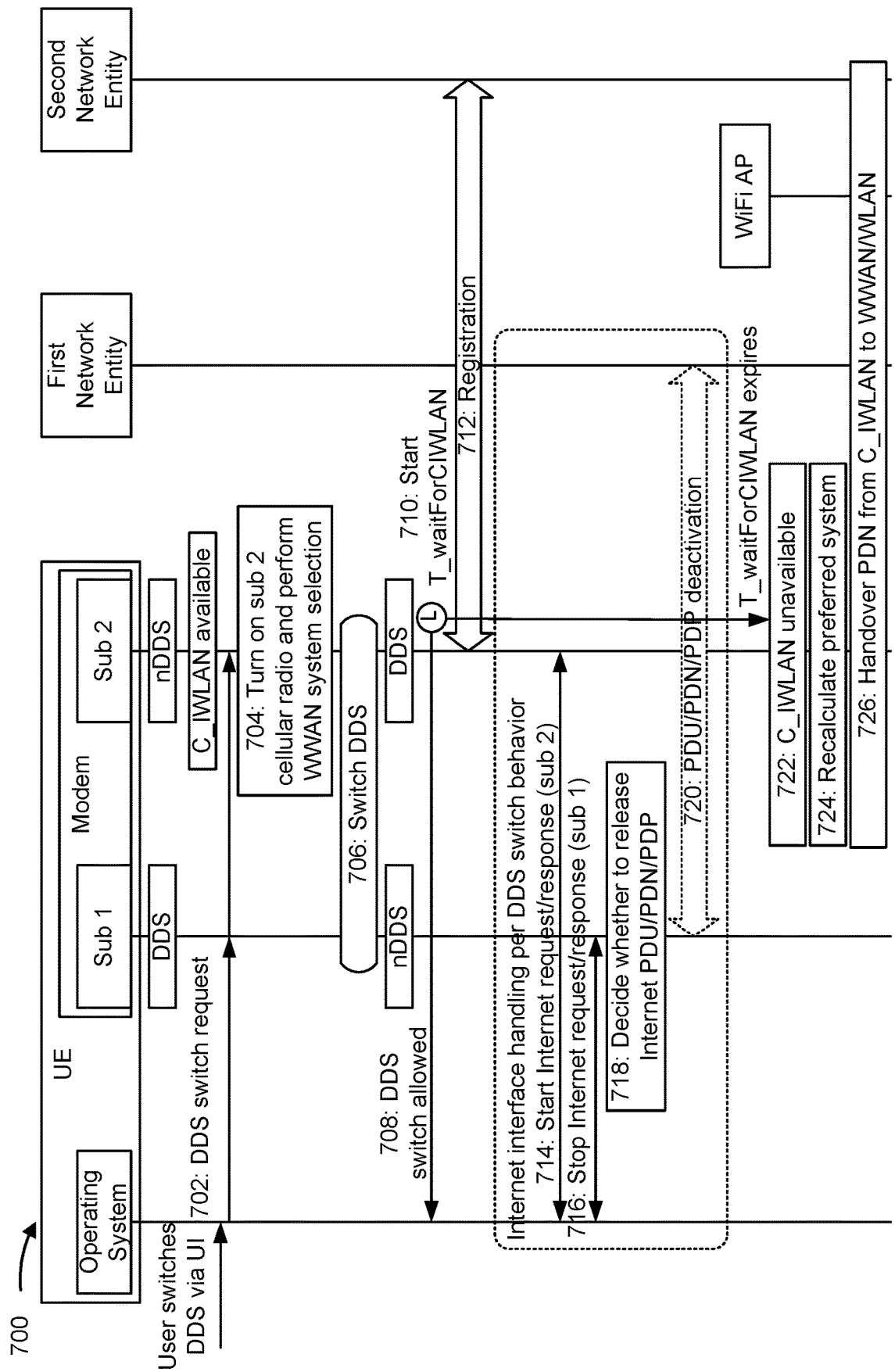

FIG. 7 is a diagram illustrating an example 700 associated with handovers of connections between subscriptions, in accordance with the present disclosure. As shown in FIG. 7, example 700 includes communication between a UE (e.g., UE 120), a first network entity (e.g., base station 110a), and a second network entity (e.g., base station 110b). In some aspects, the UE, the first network entity, and the second network entity may be included in a wireless network, such as wireless network 100.

In some aspects, the UE may include a first subscription and a second subscription. The first subscription may be associated with the first network entity, which may serve the first subscription. The second subscription may be associated with the second network entity, which may serve the second subscription. A DDS may initially be associated with the first subscription, and an nDDS may initially be associated with the second subscription. A C_IWLAN (or non-3GPP tunnel over cellular network) may be available at the second subscription when the nDDS is associated with the second subscription.

As shown by reference number 702, the first subscription may receive a DDS switch request from an operating system of the UE. The DDS switch request may be based at least in part on a user of the UE indicating a DDS switch via a user interface of the UE. The first subscription may forward the DDS switch request to the second subscription.

As shown by reference number 704, the second subscription may turn on a cellular radio associated with the second subscription (when the cellular radio was previously off). The second subscription may perform a WWAN system selection.

As shown by reference number 706, the first subscription and the second subscription may perform a DDS switching based at least in part on the DDS switch request. The DDS switching may result in the nDDS becoming associated with the first subscription and the DDS becoming associated with the second subscription. The first subscription may be an old DDS, and the second subscription may be a new DDS.

As shown by reference number 708, the first subscription may transmit, to the operating system, a message indicating that the DDS switching was allowed. The first subscription may transmit the message after the DDS switching occurs.

As shown by reference number 710, the new DDS may start a T_waitForCIWLAN timer based at least in part on the DDS switching. The T_waitForCIWLAN timer may be associated with a C_IWLAN of the new DDS.

As shown by reference number 712, the new DDS may perform a registration and Internet connection establishment with the second network entity.

In some aspects, the UE may perform an Internet interface handling per a DDS switch behavior. As shown by reference number 714, the operating system and the new DDS may transmit a start Internet request and a start Internet response, respectively. As shown by reference number 716, the operating system and the new DDS may transmit a stop Internet request and a start Internet response, respectively. As shown by reference number 718, the first subscription may determine whether to release an Internet PDU or PDN or packet data protocol (PDP). As shown by reference number 720, the first subscription and the first network entity may perform a PDU/PDN/PDP deactivation.

As shown by reference number 722, the new DDS may determine, after an expiry of the T_waitForCIWLAN timer, that the C_IWLAN of the new DDS is not available. In other words, the new DDS may determine when the T_waitForCIWLAN timer expires and no C_IWLAN is available.

As shown by reference number 724, the new DDS may recalculate a most preferred data system for each existing cellular tunnel associated with the second subscription. The new DDS may recalculate the most preferred data system for each existing cellular tunnel associated with the new DDS based at least in part on the C_IWLAN of the new DDS being unavailable.

As shown by reference number 726, the new DDS may perform a handover of a C_IWLAN PDN connection of the old DDS to a WWAN or a WLAN (e.g., a WiFi access point) based at least in part on the most preferred data system for each existing cellular tunnel associated with the new DDS. The C_IWLAN PDN connection may be associated with an active voice call of the UE, where the active voice call may initially be performed using the old DDS. After the C_IWLAN of the new DDS becomes available, the new DDS may perform a handover of the C_IWLAN PDN connection from a tunnel established over a cellular Internet connection associated with the first subscription to a tunnel established over a cellular Internet connection associated with the second subscription (e.g., a handover from a first subscription cellular tunnel to a second subscription cellular tunnel).

In some aspects, when the T_waitForCIWLAN timer expires and the C_IWLAN of the new DDS is still not available, the UE may perform a UE fallback behavior. The UE may hand over the C_IWLAN PDN connection from the old DDS to the WWAN/WLAN. At a later point in time, if the C_IWLAN of the new DDS becomes available, the UE may hand over the C_IWLAN PDN connection from the WWAN/WLAN to the new DDS.

In other words, when the T_waitForCIWLAN timer expires and the C_IWLAN associated with the new DDS is still not available, the UE may perform the UE fallback behavior. The UE may hand over the C_IWLAN PDN connection from the old DDS to the WWAN/WLAN. If the C_IWLAN associated with the new DDS becomes available, the UE may hand over the C_IWLAN PDN connection to the C_IWLAN associated with the new DDS.

As indicated above, FIG. 7 is provided as an example. Other examples may differ from what is described with regard to FIG. 7.

Figure 8:
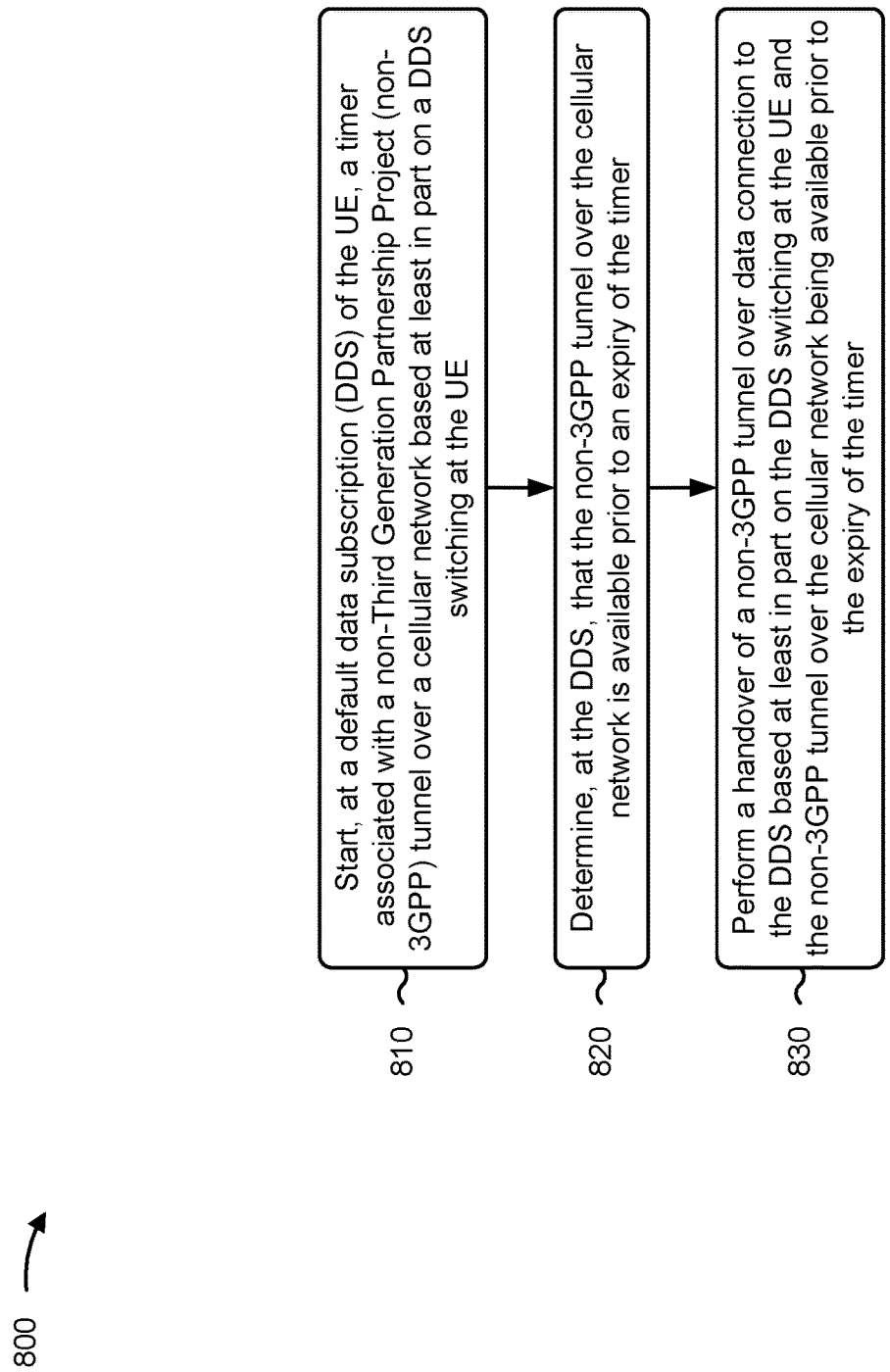
FIGS. 8-9 are diagrams illustrating example processes associated with handovers of connections between subscriptions, in accordance with the present disclosure.

FIG. 8 is a diagram illustrating an example process 800 performed, for example, by a UE, in accordance with the present disclosure. Example process 800 is an example where the UE (e.g., UE 120) performs operations associated with handovers of connections between subscriptions.

As shown in FIG. 8, in some aspects, process 800 may include starting, at a DDS of the UE, a timer associated with a non-3GPP tunnel over a cellular network based at least in part on a DDS switching at the UE (block 810). For example, the UE (e.g., using communication manager 140 and/or timer component 1008, depicted in FIG. 10) may start, at a DDS of the UE, a timer associated with a non-3GPP tunnel over a cellular network based at least in part on a DDS switching at the UE, as described above.

As further shown in FIG. 8, in some aspects, process 800 may include determining, at the DDS, that the non-3GPP tunnel over the cellular network is available prior to an expiry of the timer (block 820). For example, the UE (e.g., using communication manager 140 and/or determination component 1010, depicted in FIG. 10) may determine, at the DDS, that the non-3GPP tunnel over the cellular network is available prior to an expiry of the timer, as described above.

As further shown in FIG. 8, in some aspects, process 800 may include performing a handover of a non-3GPP tunnel over data connection to the DDS based at least in part on the DDS switching at the UE and the non-3GPP tunnel over the cellular network being available prior to the expiry of the timer (block 830). For example, the UE (e.g., using communication manager 140 and/or handover component 1012, depicted in FIG. 10) may perform a handover of a non-3GPP tunnel over data connection to the DDS based at least in part on the DDS switching at the UE and the non-3GPP tunnel over the cellular network being available prior to the expiry of the timer, as described above.

Process 800 may include additional aspects, such as any single aspect or any combination of aspects described below and/or in connection with one or more other processes described elsewhere herein.

In a first aspect, a first subscription of the UE is a DDS prior to the DDS switching and a second subscription of the UE is an nDDS prior to the DDS switching, and the first subscription of the UE is an nDDS based at least in part on the DDS switching and the second subscription of the UE is the DDS based at least in part on the DDS switching, wherein the DDS switching comprises switching data traffic from the first subscription to the second subscription.

In a second aspect, alone or in combination with the first aspect, process 800 includes performing the handover of the non-3GPP tunnel over data connection based at least in part on signaling between the DDS and a network entity.

In a third aspect, alone or in combination with one or more of the first and second aspects, the DDS of the UE is a new DDS based at least in part on the DDS switching.

In a fourth aspect, alone or in combination with one or more of the first through third aspects, the DDS switching is based at least in part on one or more of a user input via a user interface of the UE or a status of the UE.

In a fifth aspect, alone or in combination with one or more of the first through fourth aspects, the non-3GPP tunnel over data connection is directly handed over to the DDS without initially being handed over to a WWAN, wherein the DDS is associated with a second subscription of the UE.

In a sixth aspect, alone or in combination with one or more of the first through fifth aspects, the non-3GPP tunnel over data connection is associated with an active voice call, or the non-3GPP tunnel over data connection is not associated with an active voice call.

In a seventh aspect, alone or in combination with one or more of the first through sixth aspects, wherein the non-3GPP tunnel over data connection includes at least one of an evolved packet data gateway tunnel or a non-3GPP interworking function tunnel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
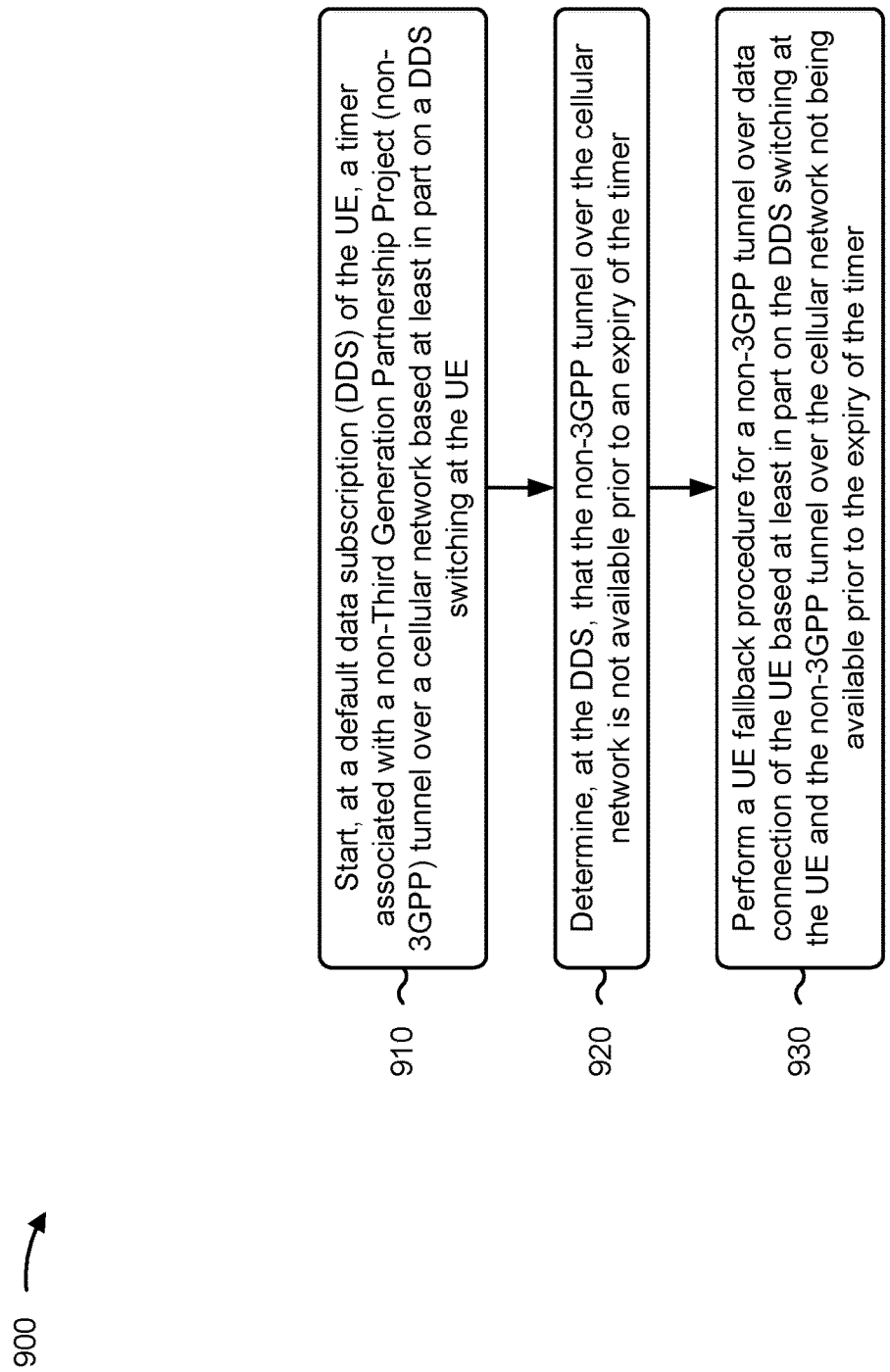

FIG. 9 is a diagram illustrating an example process 900 performed, for example, by a UE, in accordance with the present disclosure. Example process 900 is an example where the UE (e.g., UE 120) performs operations associated with handovers of connections between subscriptions.

As shown in FIG. 9, in some aspects, process 900 may include starting, at a DDS of the UE, a timer associated with a non-3GPP tunnel over a cellular network based at least in part on a DDS switching at the UE (block 910). For example, the UE (e.g., using communication manager 140 and/or timer component 1008, depicted in FIG. 10) may start, at a DDS of the UE, a timer associated with a non-3GPP tunnel over a cellular network based at least in part on a DDS switching at the UE, as described above.

As further shown in FIG. 9, in some aspects, process 900 may include determining, at the DDS, that the non-3GPP tunnel over the cellular network is not available prior to an expiry of the timer (block 920). For example, the UE (e.g., using communication manager 140 and/or determination component 1010, depicted in FIG. 10) may determine, at the DDS, that the non-3GPP tunnel over the cellular network is not available prior to an expiry of the timer, as described above.

As further shown in FIG. 9, in some aspects, process 900 may include performing a UE fallback procedure for a non-3GPP tunnel over data connection of the UE based at least in part on the DDS switching at the UE and the non-3GPP tunnel over the cellular network not being available prior to the expiry of the timer (block 930). For example, the UE (e.g., using communication manager 140 and/or handover component 1012, depicted in FIG. 10) may perform a UE fallback procedure for a non-3GPP tunnel over data connection of the UE based at least in part on the DDS switching at the UE and the non-3GPP tunnel over the cellular network not being available prior to the expiry of the timer, as described above.

Process 900 may include additional aspects, such as any single aspect or any combination of aspects described below and/or in connection with one or more other processes described elsewhere herein.

In a first aspect, process 900 includes performing a handover of the non-3GPP tunnel over data connection to a WWAN associated with the DDS; determining, after the non-3GPP tunnel over data connection is handed over to the WWAN, that the non-3GPP tunnel over the cellular network is available at the DDS; and performing a handover of the non-3GPP tunnel over data connection from the WWAN to the non-3GPP tunnel over the cellular network that is available at the DDS.

In a second aspect, alone or in combination with the first aspect, process 900 includes performing the handover of the non-3GPP tunnel over data connection based at least in part on signaling between the DDS and a network entity.

In a third aspect, alone or in combination with one or more of the first and second aspects, a first subscription of the UE is a DDS prior to the DDS switching and a second subscription of the UE is an nDDS prior to the DDS switching, and the first subscription of the UE is an nDDS based at least in part on the DDS switching and the second subscription of the UE is the DDS based at least in part on the DDS switching, wherein the DDS switching comprises switching data traffic from the first subscription to the second subscription.

In a fourth aspect, alone or in combination with one or more of the first through third aspects, the DDS of the UE is a new DDS based at least in part on the DDS switching.

In a fifth aspect, alone or in combination with one or more of the first through fourth aspects, the DDS switching is based at least in part on one or more of a user input via a user interface of the UE or a status of the UE.

In a sixth aspect, alone or in combination with one or more of the first through fifth aspects, the non-3GPP tunnel over data connection is associated with an active voice call.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
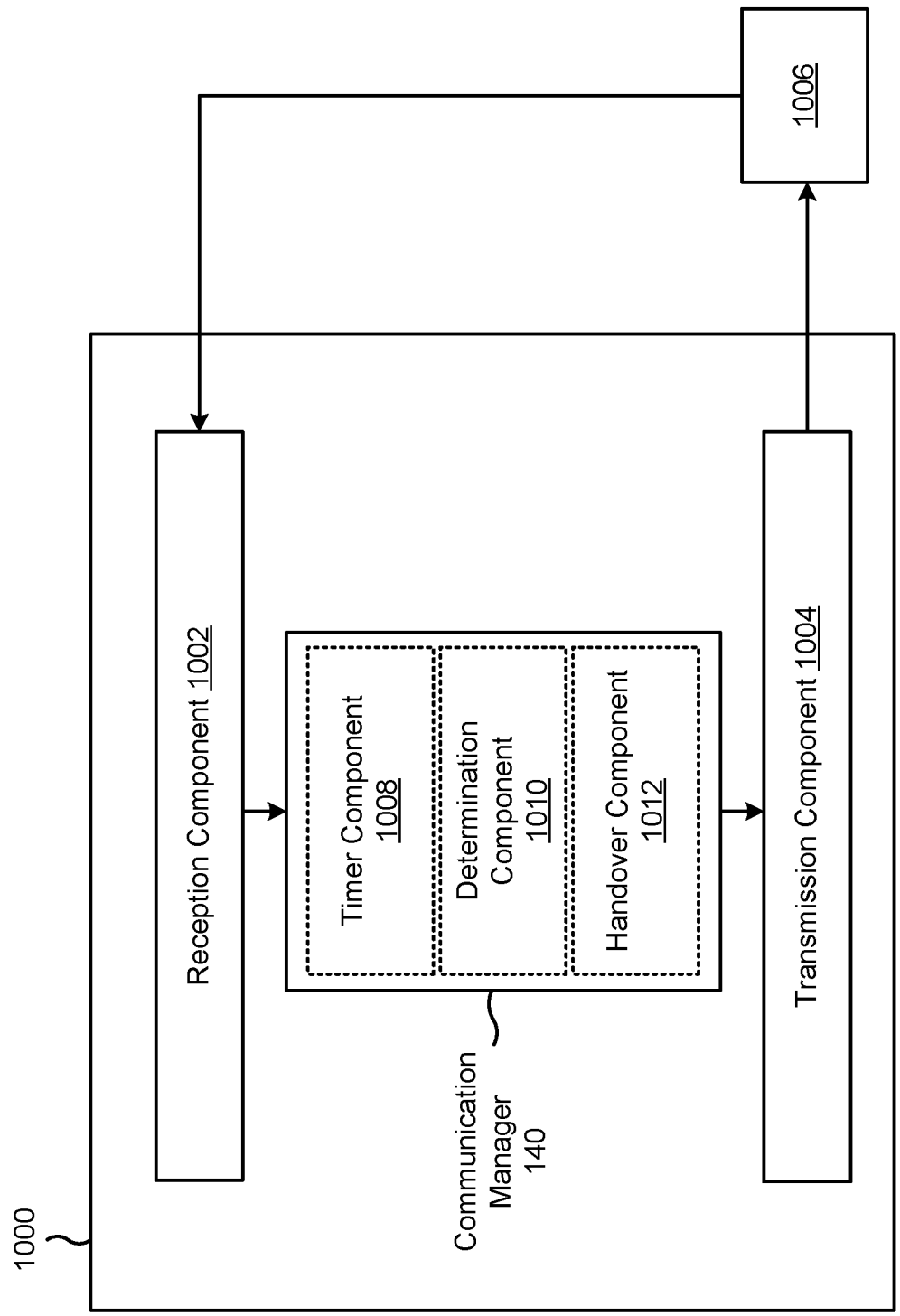
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a timer component 1008, a determination component 1010, or a handover component 1012, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The timer component 1008 may start, at a DDS of the UE, a timer associated with a non-3GPP tunnel over a cellular network based at least in part on a DDS switching at the UE. The determination component 1010 may determine, at the DDS, that the non-3GPP tunnel over the cellular network is available prior to an expiry of the timer. The handover component 1012 may perform a handover of a non-3GPP tunnel over data connection to the DDS based at least in part on the DDS switching at the UE and the non-3GPP tunnel over the cellular network being available prior to the expiry of the timer.

The timer component 1008 may start, at a DDS of the UE, a timer associated with a non-3GPP tunnel over a cellular network based at least in part on a DDS switching at the UE. The determination component 1010 may determine, at the DDS, that the non-3GPP tunnel over the cellular network is not available prior to an expiry of the timer. The handover component 1012 may perform a UE fallback procedure for a non-3GPP tunnel over data connection of the UE based at least in part on the DDS switching at the UE and the non-3GPP tunnel over the cellular network not being available prior to the expiry of the timer.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: starting, at a default data subscription (DDS) of the UE, a timer associated with a non-Third Generation Partnership Project (non-3GPP) tunnel over a cellular network based at least in part on a DDS switching at the UE; determining, at the DDS, that the non-3GPP tunnel over the cellular network is available prior to an expiry of the timer; and performing a handover of a non-3GPP tunnel over data connection to the DDS based at least in part on the DDS switching at the UE and the non-3GPP tunnel over the cellular network being available prior to the expiry of the timer.

Aspect 2: The method of Aspect 1, wherein: a first subscription of the UE is a DDS prior to the DDS switching and a second subscription of the UE is a non-DDS (nDDS) prior to the DDS switching; and the first subscription of the UE is an nDDS based at least in part on the DDS switching and the second subscription of the UE is the DDS based at least in part on the DDS switching, wherein the DDS switching comprises switching data traffic from the first subscription to the second subscription.

Aspect 3: The method of any of Aspects 1 through 2, wherein performing the handover of the non-3GPP tunnel over data connection is based at least in part on signaling between the DDS and a network entity.

Aspect 4: The method of any of Aspects 1 through 3, wherein the DDS of the UE is a new DDS based at least in part on the DDS switching.

Aspect 5: The method of any of Aspects 1 through 4, wherein the DDS switching is based at least in part on one or more of: a user input via a user interface of the UE or a status of the UE.

Aspect 6: The method of any of Aspects 1 through 5, herein the non-3GPP tunnel over data connection is directly handed over to the DDS without initially being handed over to a wireless wide area network, wherein the DDS is associated with a second subscription of the UE.

Aspect 7: The method of any of Aspects 1 through 6, wherein the non-3GPP tunnel over data connection is associated with an active voice call, or the non-3GPP tunnel over data connection is not associated with an active voice call.

Aspect 8: The method of any of Aspects 1 through 7, wherein the non-3GPP tunnel over data connection includes at least one of an evolved packet data gateway tunnel or a non-3GPP interworking function tunnel.

Aspect 9: A method of wireless communication performed by a user equipment (UE), comprising: starting, at a default data subscription (DDS) of the UE, a timer associated with a non-Third Generation Partnership Project (non-3GPP) tunnel over a cellular network based at least in part on a DDS switching at the UE; determining, at the DDS, that the non-3GPP tunnel over the cellular network is not available prior to an expiry of the timer; and performing a UE fallback procedure for a non-3GPP tunnel over data connection of the UE based at least in part on the DDS switching at the UE and the non-3GPP tunnel over the cellular network not being available prior to the expiry of the timer.

Aspect 10: The method of Aspect 9, wherein performing the UE fallback procedure comprises: performing a handover of the non-3GPP tunnel over data connection to a wireless wide area network (WWAN) associated with the DDS; determining, after the non-3GPP tunnel over data connection is handed over to the WWAN, that the non-3GPP tunnel over the cellular network is available at the DDS; and performing a handover of the non-3GPP tunnel over data connection from the WWAN to the non-3GPP tunnel over the cellular network that is available at the DDS.

Aspect 11: The method of Aspect 10, wherein performing the handover of the non-3GPP tunnel over data connection is based at least in part on signaling between the DDS and a network entity.

Aspect 12: The method of any of Aspects 9 through 11, wherein: a first subscription of the UE is a DDS prior to the DDS switching and a second subscription of the UE is a non-DDS (nDDS) prior to the DDS switching; and the first subscription of the UE is an nDDS based at least in part on the DDS switching and the second subscription of the UE is the DDS based at least in part on the DDS switching, wherein the DDS switching comprises switching data traffic from the first subscription to the second subscription.

Aspect 13: The method of any of Aspects 9 through 12, wherein the DDS of the UE is a new DDS based at least in part on the DDS switching.

Aspect 14: The method of any of Aspects 9 through 13, wherein the DDS switching is based at least in part on one or more of: a user input via a user interface of the UE or a status of the UE.

Aspect 15: The method of any of Aspects 9 through 14, wherein the non-3GPP tunnel over data connection is associated with an active voice call.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
start, at a default data subscription (DDS) of the UE, a timer associated with a non-Third Generation Partnership Project (non-3GPP) tunnel over a cellular network based at least in part on a DDS switching at the UE;
determine, at the DDS, that the non-3GPP tunnel over the cellular network is available prior to an expiry of the timer; and
perform a handover of a non-3GPP tunnel over data connection to the DDS based at least in part on the DDS switching at the UE and the non-3GPP tunnel over the cellular network being available prior to the expiry of the timer.

2. The apparatus of claim 1, wherein:
a first subscription of the UE is a DDS prior to the DDS switching and a second subscription of the UE is a non-DDS (nDDS) prior to the DDS switching; and
the first subscription of the UE is an nDDS based at least in part on the DDS switching and the second subscription of the UE is the DDS based at least in part on the DDS switching, wherein the DDS switching comprises switching data traffic from the first subscription to the second subscription.

3. The apparatus of claim 1, wherein the one or more processors are configured to perform the handover of the non-3GPP tunnel over data connection based at least in part on signaling between the DDS and a network entity.

4. The apparatus of claim 1, wherein the DDS of the UE is a new DDS based at least in part on the DDS switching.

5. The apparatus of claim 1, wherein the DDS switching is based at least in part on one or more of: a user input via a user interface of the UE or a status of the UE.

6. The apparatus of claim 1, wherein the non-3GPP tunnel over data connection is directly handed over to the DDS without initially being handed over to a wireless wide area network, and wherein the DDS is associated with a second subscription of the UE.

7. The apparatus of claim 1, wherein the non-3GPP tunnel over data connection is associated with an active voice call, or the non-3GPP tunnel over data connection is not associated with an active voice call.

8. The apparatus of claim 1, wherein the non-3GPP tunnel over data connection includes at least one of an evolved packet data gateway tunnel or a non-3GPP interworking function tunnel.

9. An apparatus for wireless communication at a user equipment (UE), comprising:
a memory; and
one or more processors, coupled to the memory, configured to:
start, at a default data subscription (DDS) of the UE, a timer associated with a non-Third Generation Partnership Project (non-3GPP) tunnel over a cellular network based at least in part on a DDS switching at the UE;
determine, at the DDS, that the non-3GPP tunnel over the cellular network is not available prior to an expiry of the timer; and
perform a UE fallback procedure for a non-3GPP tunnel over data connection of the UE based at least in part on the DDS switching at the UE and the non-3GPP tunnel over the cellular network not being available prior to the expiry of the timer.

10. The apparatus of claim 9, wherein the one or more processors, to perform the UE fallback procedure, are configured to:
perform a handover of the non-3GPP tunnel over data connection to a wireless wide area network (WWAN) associated with the DDS;
determine, after the non-3GPP tunnel over data connection is handed over to the WWAN, that the non-3GPP tunnel over the cellular network is available at the DDS; and
perform a handover of the non-3GPP tunnel over data connection from the WWAN to the non-3GPP tunnel over the cellular network that is available at the DDS.

11. The apparatus of claim 10, wherein the one or more processors are configured to perform the handover of the non-3GPP tunnel over data connection based at least in part on signaling between the DDS and a network entity.

12. The apparatus of claim 9, wherein:
a first subscription of the UE is a DDS prior to the DDS switching and a second subscription of the UE is a non-DDS (nDDS) prior to the DDS switching; and
the first subscription of the UE is an nDDS based at least in part on the DDS switching and the second subscription of the UE is the DDS based at least in part on the DDS switching, wherein the DDS switching comprises switching data traffic from the first subscription to the second subscription.

13. The apparatus of claim 9, wherein the DDS of the UE is a new DDS based at least in part on the DDS switching.

14. The apparatus of claim 9, wherein the DDS switching is based at least in part on one or more of: a user input via a user interface of the UE or a status of the UE.

15. The apparatus of claim 9, wherein the non-3GPP tunnel over data connection is associated with an active voice call.

16. A method of wireless communication performed by a user equipment (UE), comprising:
starting, at a default data subscription (DDS) of the UE, a timer associated with a non-Third Generation Partnership Project (non-3GPP) tunnel over a cellular network based at least in part on a DDS switching at the UE;
determining, at the DDS, that the non-3GPP tunnel over the cellular network is available prior to an expiry of the timer; and
performing a handover of a non-3GPP tunnel over data connection to the DDS based at least in part on the DDS switching at the UE and the non-3GPP tunnel over the cellular network being available prior to the expiry of the timer.

17. The method of claim 16, wherein:
a first subscription of the UE is a DDS prior to the DDS switching and a second subscription of the UE is a non-DDS (nDDS) prior to the DDS switching; and
the first subscription of the UE is an nDDS based at least in part on the DDS switching and the second subscription of the UE is the DDS based at least in part on the DDS switching, wherein the DDS switching comprises switching data traffic from the first subscription to the second subscription.

18. The method of claim 16, wherein performing the handover of the non-3GPP tunnel over data connection is based at least in part on signaling between the DDS and a network entity.

19. The method of claim 16, wherein the DDS of the UE is a new DDS based at least in part on the DDS switching.

20. The method of claim 16, wherein the DDS switching is based at least in part on one or more of: a user input via a user interface of the UE or a status of the UE.

21. The method of claim 16, herein the non-3GPP tunnel over data connection is directly handed over to the DDS without initially being handed over to a wireless wide area network, and wherein the DDS is associated with a second subscription of the UE.

22. The method of claim 16, wherein the non-3GPP tunnel over data connection is associated with an active voice call, or the non-3GPP tunnel over data connection is not associated with an active voice call.

23. The method of claim 16, wherein the non-3GPP tunnel over data connection includes at least one of an evolved packet data gateway tunnel or a non-3GPP interworking function tunnel.

24. A method of wireless communication performed by a user equipment (UE), comprising:
starting, at a default data subscription (DDS) of the UE, a timer associated with a non-Third Generation Partnership Project (non-3GPP) tunnel over a cellular network based at least in part on a DDS switching at the UE;
determining, at the DDS, that the non-3GPP tunnel over the cellular network is not available prior to an expiry of the timer; and
performing a UE fallback procedure for a non-3GPP tunnel over data connection of the UE based at least in part on the DDS switching at the UE and the non-3GPP tunnel over the cellular network not being available prior to the expiry of the timer.

25. The method of claim 24, wherein performing the UE fallback procedure comprises:
performing a handover of the non-3GPP tunnel over data connection to a wireless wide area network (WWAN) associated with the DDS;
determining, after the non-3GPP tunnel over data connection is handed over to the WWAN, that the non-3GPP tunnel over the cellular network is available at the DDS; and
performing a handover of the non-3GPP tunnel over data connection from the WWAN to the non-3GPP tunnel over the cellular network that is available at the DDS.

26. The method of claim 25, wherein performing the handover of the non-3GPP tunnel over data connection is based at least in part on signaling between the DDS and a network entity.

27. The method of claim 24, wherein:
a first subscription of the UE is a DDS prior to the DDS switching and a second subscription of the UE is a non-DDS (nDDS) prior to the DDS switching; and
the first subscription of the UE is an nDDS based at least in part on the DDS switching and the second subscription of the UE is the DDS based at least in part on the DDS switching, wherein the DDS switching comprises switching data traffic from the first subscription to the second subscription.

28. The method of claim 24, wherein the DDS of the UE is a new DDS based at least in part on the DDS switching.

29. The method of claim 24, wherein the DDS switching is based at least in part on one or more of: a user input via a user interface of the UE or a status of the UE.

30. The method of claim 24, wherein the non-3GPP tunnel over data connection is associated with an active voice call.

* * * * *